United States Patent [19]

Hamane et al.

[11] 4,358,099

[45] Nov. 9, 1982

[54] STATOR CORE HOLDING DEVICE FOR FABRICATING A STATOR ASSEMBLY FOR AN ELECTRICAL MACHINE

[75] Inventors: Tokuhito Hamane, Hirakata; Toshio Kinoshita, Katano; Masafumi Kihira, Osaka, all of Japan

[73] Assignee: Matsushita Electrical Industrial Co. Ltd., Osaka, Japan

[21] Appl. No.: 281,922

[22] Filed: Jul. 10, 1981

Related U.S. Application Data

[62] Division of Ser. No. 43,027, May 29, 1979, Pat. No. 4,296,543.

[30] Foreign Application Priority Data

| | | |
|---|---|---|
| May 30, 1978 [JP] | Japan | 53-65209 |
| May 22, 1979 [CA] | Canada | 328011 |
| May 29, 1979 [DE] | Fed. Rep. of Germany | 2921794 |
| May 29, 1979 [PH] | Philippines | 22578 |
| May 29, 1979 [GB] | United Kingdom | 7918569 |

[51] Int. Cl.³ .................................... H02K 15/06
[52] U.S. Cl. ...................................... 269/93; 29/732; 269/233

[58] Field of Search ............ 29/596, 736, 732, 564.1; 269/93, 233, 228

[56] References Cited

U.S. PATENT DOCUMENTS

| 3,570,835 | 3/1971 | McPherson | 269/233 X |
| 4,186,478 | 2/1980 | Hamane et al. | 29/736 X |
| 4,299,025 | 11/1981 | Laner et al. | 29/736 X |

Primary Examiner—Carl E. Hall
Attorney, Agent, or Firm—Spencer & Kaye

[57] ABSTRACT

A holding device used in a drawing-in device for inserting winding coils into a stator core of an electrical machine from a transfer tool carrying the winding coils. The holding device includes a stationary cam plate defining therein a cam groove and a pusher block supporting a holding down-plate, which pusher block bears guide rollers cooperating with the cam groove so that the holding-down plate is guided to the stator core disposed on the transfer tool and then applies a force in the direction of the stator core axis about which an associated rotor of electrical machine is rotated.

4 Claims, 13 Drawing Figures

STATOR CORE HOLDING DEVICE FOR FABRICATING A STATOR ASSEMBLY FOR AN ELECTRICAL MACHINE

CROSS REFERENCE TO THE RELATED APPLICATION

This application is a divisional application of U.S. Ser. No. 43,027 filed on May 29, 1979, now U.S. Pat. No. 4,296,543.

FIELD OF THE INVENTION

This invention relates to a device for inserting winding coils into a stator core of an electrical machine, particularly to a device for inserting winding coils set on a transfer tool to a stator core in one operation.

Heretofore, various kinds of devices for inserting winding coils into a stator core (hereinafter referred to as a "drawing-in device") have been used for fabricating stator assemblies of electrical machines. The conventional drawing-in device is provided with a holding device which is arranged to hold a stator core mounted on a transfer tool having winding coils to be inserted. This holding device comprises a holding-down plate which is laterally moved to the stator core carried by the transfer tool. A sufficient space is required above the transfer tool in order to introduce the stator core to the top of the transfer tool. Therefore, lateral movement of the holding-down plate to the stator core mounted on the transfer tool is necessary for this purpose without making the holding device complicated and large. The conventional holding device is provided with a four bar link mechanism with which the holding-down plate is swingably moved to the transfer tool.

Disadvantages have been experienced in such a four bar link mechanism, since a slanting force is exerted to the stator core mounted on the transfer tool which causes the transfer tool to be broken. Further, when the thickness of the stator core is changed, the force for holding the stator core is also changed; that is, the force suitable for holding the stator core cannot be expected for stator cores having various thicknesses.

Accordingly, it is a general object of the present invention to provide a new improved device for holding a stator core mounted onto a transfer tool carrying winding coils, without exerting a slanting force to the stator core to be held down.

In accordance with the present invention, a holding device includes a stationary cam plate having a cam groove to and a holding-down plate which is arranged to hold a stator core mounted a transfer tool and which is integrally incorporated with a pusher block having guide rollers cooperating with the cam groove, whereby the holding-down plate is laterally guided to the stator core and then pushes the latter with a suitable force in the direction of the axis of the stator core about which axis an associated rotor of an electrical machine rotates.

In view of the above construction, the holding device according to the present invention overcomes the above-mentioned disadvantages inherent to the conventional holding device.

BRIEF DESCRIPTION OF THE DRAWINGS

Other objects of the present invention and their attendant advantages will become readily apparent from the following description taken in conjunction with the accompanying drawings wherein.

DESCRIPTION OF THE PREFERRED EMBODIMENT

A preferred embodiment of the present invention will now be described by referring to the accompanying drawings.

Figure 1:
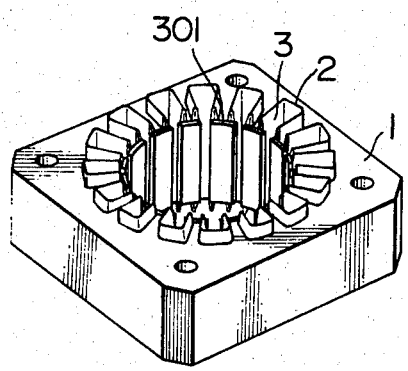
FIG. 1 is a perspective view of a stator core used in the present invention.
Figure 2:
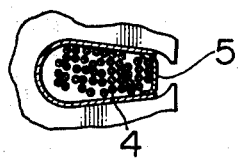
FIG. 2 is a sectional view of a groove formed in the stator core.

In FIG. 1, a stator core 1 is formed with grooves 3 insulated by insulating paper 2. As shown in FIG. 2 each groove 3 has inserted therein coils 4 and an insulating piece 5.

Figure 3:
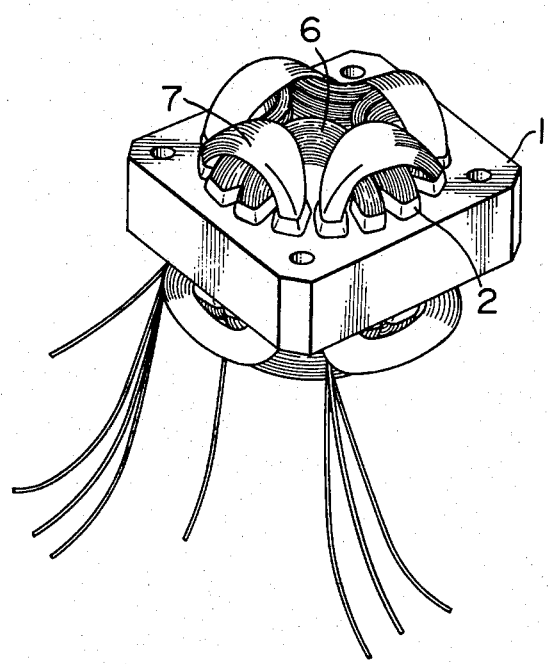
FIG. 3 is a perspective view of a stator assembly.

FIG. 3 shows a stator assembly having main coils 6 and auxiliary coils 7 drawn into the grooves 3, the auxiliary coils 7 including one or a plurality of groups of speed regulation coils if necessary.

The main coils 6, the auxiliary coils 7 and the insulating pieces 5 are inserted into the stator core 1, in one operation by a drawing-in device I, from a transfer tool A to which the main coils 6, the auxiliary coils 7 and the insulating pieces 5 are beforehand set. The drawing-in device I will be explained hereinafter in detail.

Figure 4:
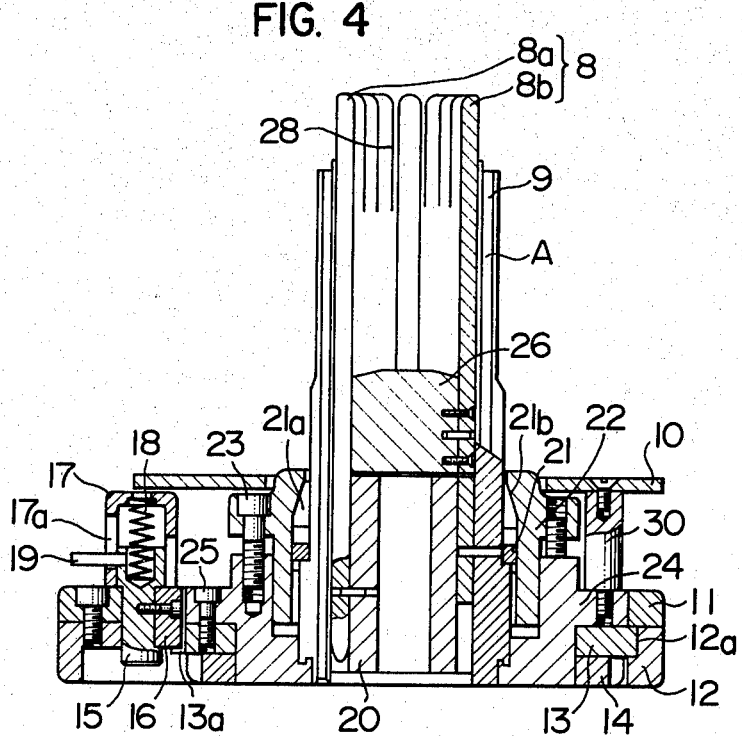
FIG. 4 is a front sectional view of the transfer tool.
Figure 5:
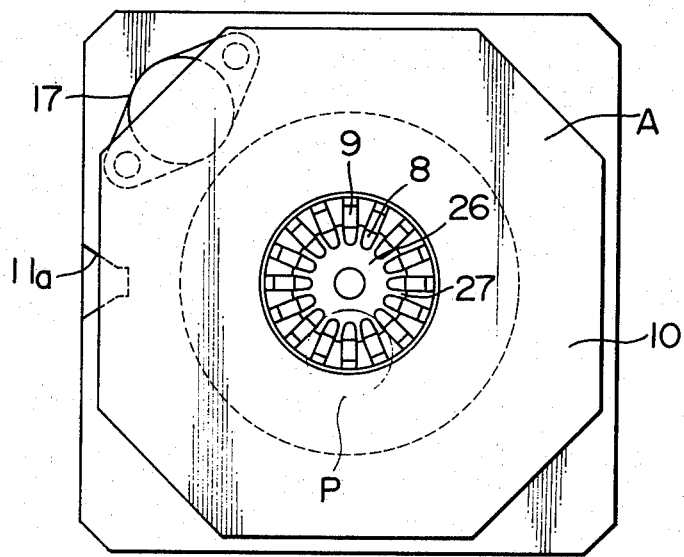
FIG. 5 is a top plan view of the transfer tool shown in FIG. 4.
Figure 6:
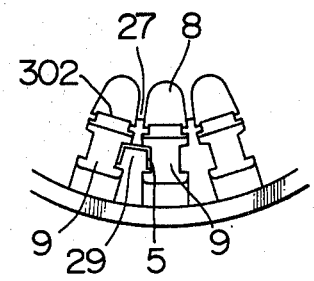
FIG. 6 is an enlarged view of a portion P of FIG. 5.
Figure 7:
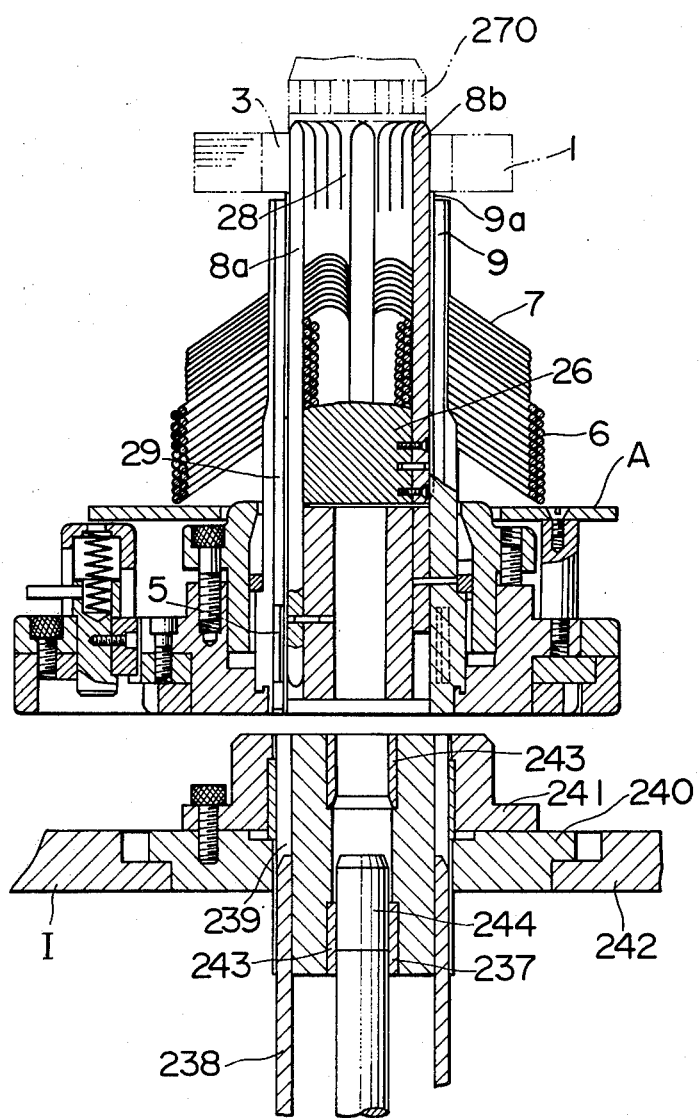
FIG. 7 is a front sectional view showing the transfer tool and the head of a drawing-in device.

The construction of the transfer tool A will be described first by referring to FIGS. 4 to 6. Reference numeral 8 designates blades; 9, insulator guide and 10 a coil receiving plate; 11 and 12, an upper pallet and a lower pallet, respectively, to which the blades 8 and insulator guides 9 are rotatably supported in the arrangement described hereinunder; 13, a disk rotatably supported in a recess 12a formed in the lower pallet 12; 14, a gear secured to disk 13; 15, an indexing pin having secured thereto a key 16 fitted in a keyway 13a formed in the disk 13; 17, a case secured to upper pallet 11 for slidably supporting the indexing pin 15; 18, a compression spring for urging the indexing pin 15 against the upper pallet 11; 19, a pin secured to the indexing pin 15 and guided by a groove 17a formed in the case 17 for preventing the indexing pin 15 from rotating; 20, a blade position setting block for maintaining the plurality of blades 8 equidistantly from one another circumferentially; 21, a collet fitted over the outer peripheries of the insulator guides 9, which is formed with axial grooves 21a, and having a tapered upper end portion 21b; and 22, a pressing ring fitted over the tapered upper end portion 21b of collet 21. By clamping pressing ring 22 against a flange 24 by means of bolts 23, it is possible to reduce the diameter of the collet 21 to thereby urge the insulator guides 9 and the blades 8 against the blade position setting block 20 to fix them in place. The flange 24 is secured to the disk 13 by bolts 25. Reference numeral 26 designates a coil pusher formed with coil feeding blades 27 arranged in a coil receiving space 28 defined by adjacent blades 8. The coil pusher 26 is guided by the blades 8 axially thereof for vertical movement. Blades 8 include elongated fixed blades 8a attached to the blade position setting block 20, and short movable blades 8b attached to coil pusher 26. Reference numeral 29 designates insulator guide slots each defined by adjacent insulator guides 9; 30, connecting rods secured at its upper end to the coil receiving plate 10 and at the lower end to the flange 24.

The construction of the drawing-in device I will now be described by referring to FIGS. 7 to 13. Like the transfer tool A delivered to the insulator insertion device H, the transfer tool A delivered to the drawing-in device I has its position regulated. Below the transfer tool A in FIG. 7, reference numeral 237 designates a housing formed on its outer circumferential surface with guide grooves 239 extending axially and disposed equidistantly from one another to guide the insulator pushers 238 moving therethrough. When the insulating piece guide slots 29 are 16 (sixteen) in number, for example, the guide grooves 239 are also 16 (sixteen) in number and aligned with the insulating piece guide slots 29. Reference numeral 240 designates a flange fitted over the housing 237 for securing the latter in place by a keep ring 241, 242, a support plate to which flange 240 is secured; 243, bearings mounted in the housing 237 for guiding a coil pusher rod 244; and 245, a support plate for suppoting the insulator pushers 238 in grooves formed therein for setting the lower ends of of the insulator pushers 238 equidistantly from one another circumferentially of the support plate 245. The coil pusher rod 244 is secured to the center of support plate 245 and has formed at its forward end a recess for attaching and detaching the coil pusher 26. Reference numeral 246 designates a movable guide formed therein with a plurality of openings for guiding the intermediate portions of insulator pushers 238. The movable guide 246 is also formed at its center with an opening 246a larger in diameter than the coil pusher rod 244, and with two openings having slide bearings 247, respectively mounted therein. Reference numeral 248 designates guide shafts slidably supported by slide bearings 247 and secured at upper ends thereof to flange 240; 249, a pusher having the support plate 245 secured thereto and slide bearings 250 secured to either end thereof. The pusher 249 also has ball screw bearings 251 secured to portions thereof disposed rightwardly and leftwardly of its center, respectively. Reference numeral 252 designates shafts secured at opposite ends thereof to the support plate 242 and a bottom plate 253 for guiding the slide screw bearings 250 mounted in the pusher 249; 254, ball screw shafts rotatably supported at the upper ends thereof by the support plate 242 through bearings 255 and 256 and at lower ends thereof by the bottom plate 253 through bearings 257 and 258; 259, receiver rings each positioned against the upper end of the inner race of one of the bearings 258; 260 sprockets each secured to one of the ball screw shafts 254 by forcing a clamping ring 261 against the sprocket 260 by a holding-down plate 262; 263, a motor secured to a base 264 and having an output shaft extending downwardly for mounting a sprocket at its end; 265, chains connected to the sprockets 260 at the lower ends of the ball screw shafts 254 and the sprocket secured to the end of the output shaft of the motor 263, 266, stopper bolts threadably connected to the undersurface of the pusher 249 for freely adjusting their length; 267, stopper blocks each abutting against one of stopper bolts 266 for stopping the movement of the pusher 249; 268, stopper bolts abutting against the support plate 242 when the pusher 249 moves upwardly to stop the movement of the pusher 249. The stopper bolts 268 are threadably connected to the upper surface of the pusher 249. Reference numeral 269 designates a main body supporting the support plate 242 at its top and the bottom plate 253 at its bottom; 270, a blade position setter (See FIG. 10) formed with a plurality of blades 271 equidistantly disposed from one another at the outer circumferential surface of the setter 270 and interfitting with the coil receiving space 28 defined by the blades 8 of the transfer tool A for setting the position of the blades 8 by adjusting their spacing; 272, a coupling bolster. A stationary cylindrical body 273 is secured to support plate 242 at a right angle through a plate 274. Reference numeral 275 designates bearings each mounted in one of arms 276; 277, shafts secured to a plate 278 and each guided by one of the bearings 275. A plate 278 supports the upper portion of the stationary cylindrical body 273 and the lower ends of the shafts 277. Reference numeral 279 designates a mounting portion disposed at the forward end of the arm 276.

The coupling bolster 272 is secured at its lower end through a shaft coupling 280 to a rod 281a of a cylinder 281 and moves vertically in sliding movement as the rod 281a advances and retreats.

In FIGS. 10 to 13, reference numeral 282 designates a holding-down plate supported by a pusher block 283 for contacting the upper surface of a stator 1; 284, rollers respectively supported by shafts 285 aligned together in a plane perpendicular to the holding-down plate 282 and secured to the pusher block 283; and 286, a cam plate formed with a groove cam 287 rounded at its upper end and having a lower end parallel to the insulator guides 9. As understood from FIG. 12, when the drawing-in device is in its rest position the rollers 284 are in contact with the rounded upper end for movement along its cam surface. A link 288 connected to the pusher block 283 by the lower shaft 285 is connected at one end thereof to a lever 290 by a shaft 289, and the lever 290 is in turn secured at the other end thereof to the cam plate 286 by a shaft 291. The lever 290 is pivotable about the shaft 291, and the link 288 is pivotable about the shafts 285, and 289. A coupling link 292 is connected at one end thereof by a shaft 293 to the center of the lever 290 and at the other end thereof to a rod 294a of a cylinder 294. The cylinder 294 is connected at its rear to a support plate 296 by a shaft 295, and the support plate 296 is secured to a main body 297 formed therein with an opening for receiving stationary cylinderical body 273 having axial grooves formed in the split main body 297. Bolts 298 are threaded into the main body 297 for reducing the width of the grooves. A shaft 299 is located parallel to the stationary cylindrical body 273 for relative sliding movement along a groove in the main body 297 so as to keep the direction of the main body 297 invariable. The support plate 278 has a bolt 300 threadably connected at its lower end to a T-recess in the main body 297. By turning the bolt 300 circumferentially thereof, it is possible to move the main body 297 vertically in sliding movement.

In operation, initially, the blade position setter 270 for positioning the annularly arranged blades 8 equidistantly from one another is mounted in a mounting portion 279 and waits for its operation above the transfer tool A. Rearward movement of a rod 281a of the cylinder 281 moves the mounting portion 279 downwardly to insert the blade position setter 270 into the blades 8. Thereafter, the mounting portion 279 is released from the blade position setter 270 which remains in the blades 8. Forward movement of the rod 281a moves the mounting portion 279 to a position above the tool A to standby. Then, the operator puts teeth 301 (See FIG. 1) of the stator core 1 into grooves 302 (See FIG. 6) of the blades 8 and then pushes until they come into contact with the projections 9a of the insulator guides 9. For inserting the main coils 6, the auxiliary coils 7 and the insulating pieces 5 in the slots 3 of the stator coil 1, the coils come into contact with the sides of the slots 3 and may lift the stator core 1 away from the projections 9a. If the stator core 1 is released from the projections 9 during operation, a difficulty will be experienced in drawing the coils and the insulating pieces correctly into the stator grooves because the main coils 6, the auxiliary coils 7 and the insulating pieces 5 are not positioned properly in the slots 3. To avoid this problem, means should be provided for fixing the stator core axially in place while the coils and the insulating pieces are being inserted.

Figure 10:
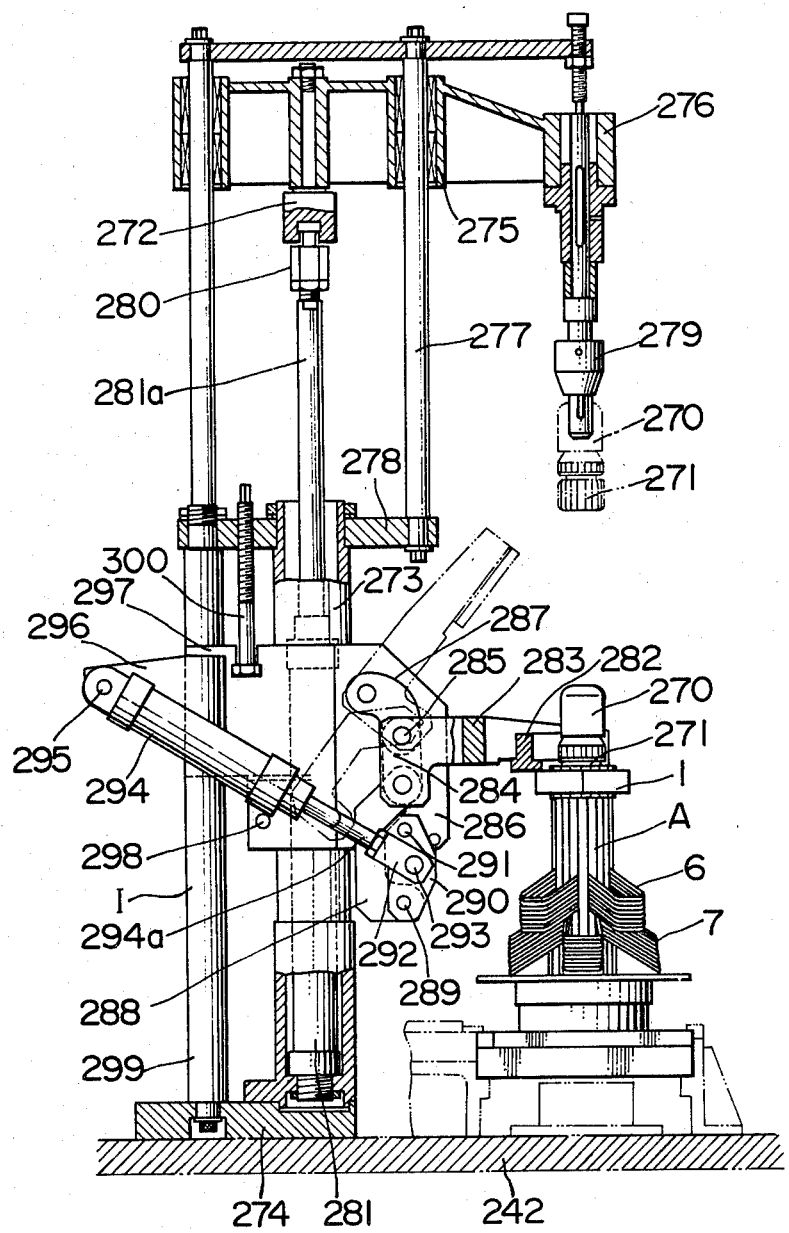
FIG. 10 is a front view of a holding apparatus located in the upper portion of the drawing-in device, and in which a holding device according to the present invention is provided.
Figure 11:
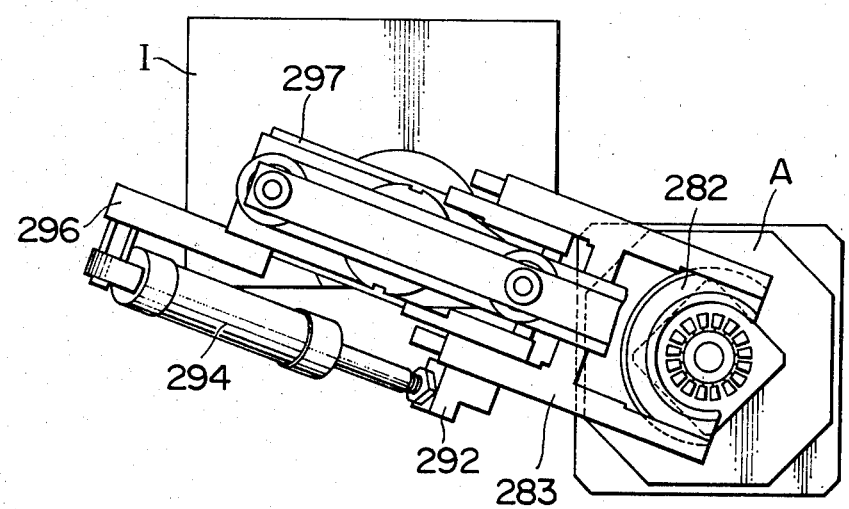
FIG. 11 is a top plane view of the holding apparatus.
Figure 12:
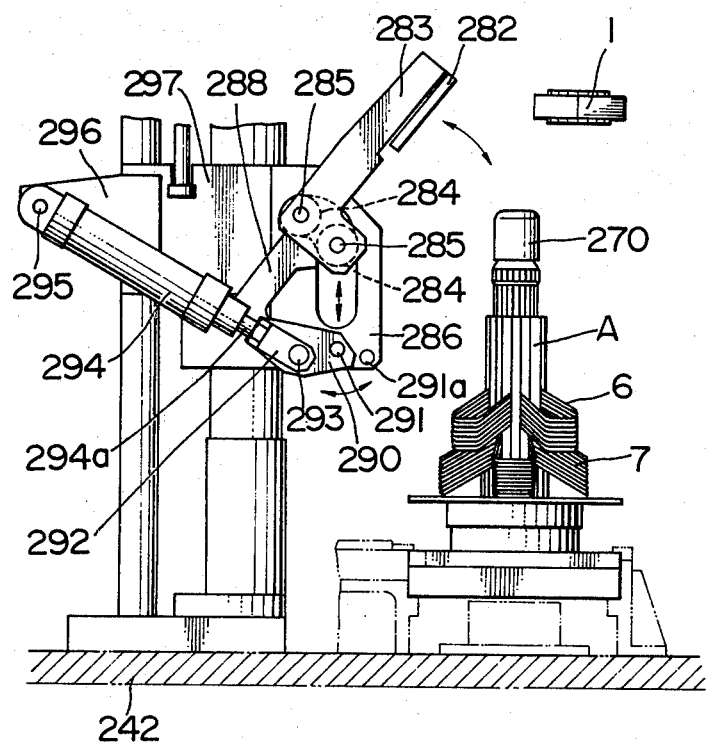
FIG. 12 is a front view of the holding device as well as the transfer tool carrying winding coils.
Figure 13:
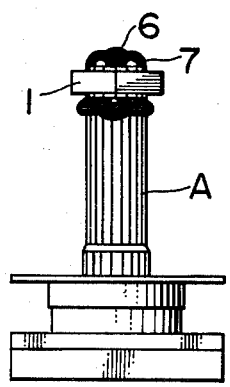
FIG. 13 is a front view of the stator core having the winding coils transferred thereto from the transfer tool.

Also, it is not enough merely to force the stator core 1 against the projections 9a of the insulator guides 9; it is necessary to provide a space large enough to permit the stator core 1 to be inserted and withdrawn. To this end, the rod 294a of the cylinder 294 is moved forwardly as shown in FIG. 10 to move, through the coupling link 292, the lever 290 in pivotal movement about the shaft 291. Pivotal movement of the lever 290 moves the position of the shaft 289 at the lower end of the link 288 downwardly as the link 288 moves in pivotal movement about shafts 285 with a result that the positions of the shafts 285 at the upper end of the link 288 moves downwardly as the rollers 284 track downwardly along the cam groove 287. When the upper roller 284 mounted in the pusher block 283 reaches from the rounded portion to a straight portion of the cam groove 287, the lower surface of holding down plate 282, which has been inclined with respect to the axis of the insulator guides 9, becomes parallel to the upper surface of the stator. Further forward movement of the rod 294a brings lever 290 into abutting engagement with a stopper pin 291a secured to the cam plate 286 (FIG. 12), thereby stopping the rod 294a. At this time, both rollers 284 are positioned in the straight portion of the cam groove 287, and the holding-down plate 282 is in contact with the upper surface of the stator core 1 in parallel therewith.

Figure 8:
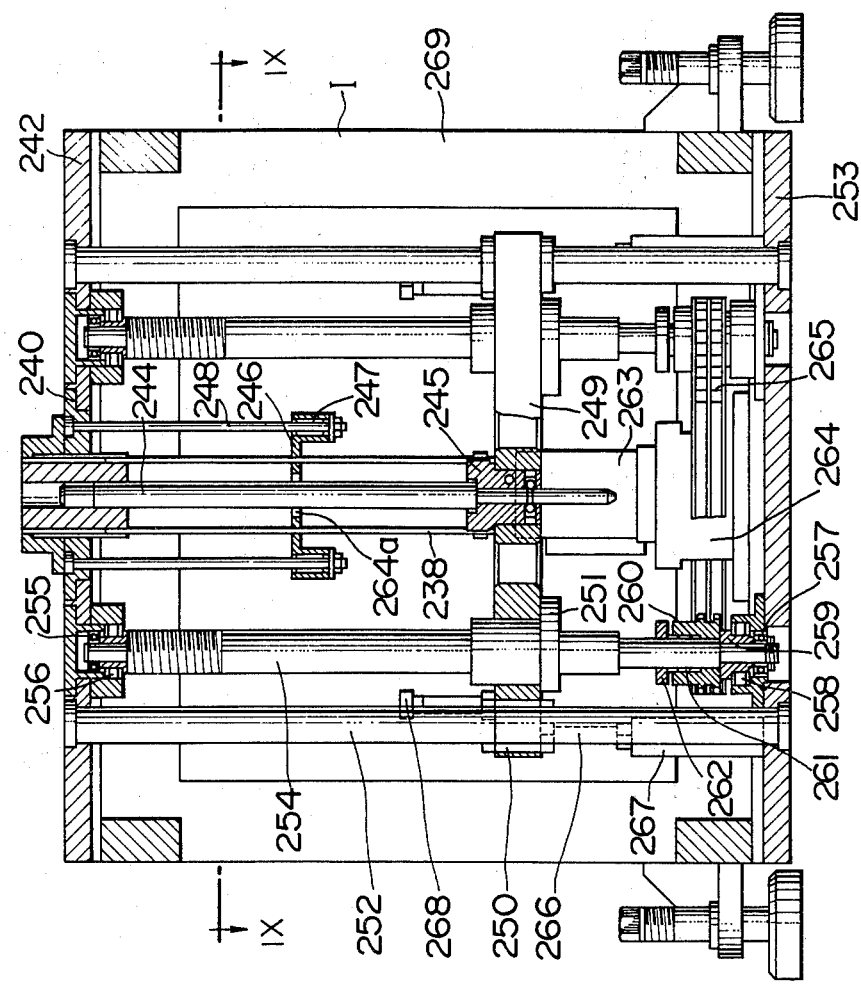
FIG. 8 is a front sectional view of the drawing-in device in its entirety.
Figure 9:
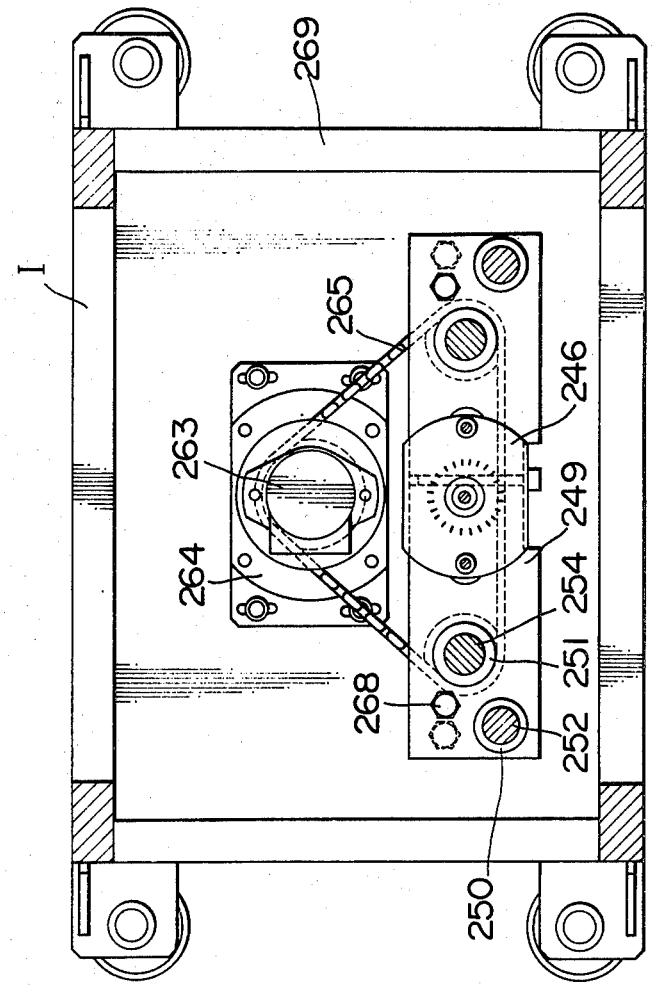
FIG. 9 is a front sectional view taken along the line IX—IX in FIG. 8.

Then, the motor 263 shown in FIG. 8 is actuated to rotate the ball screw shafts 254 to move the pusher 249 upwardly. The coil pusher rod 244 moves upwardly together with the pusher 249 until it is gripped by a gripper, not shown, of the coil pusher 26 of the transfer tool A so that the rod 244 is connected to the pusher 249. The upper surfaces of the insulator pushers 238 and the upper surface of the coil pusher 26 become constant in height, and move in a constant relation as the pusher 249 moves upwardly. Further upward movement of the pusher 249 brings the upper surfaces of the insulator pushers 238 into contact with the undersides of the insulating pieces 5, so that the former move the latter upwardly. The coil pusher 26, the movable blades 8b and the insulator pushers 238 move as a whole axially of the stator core 1, while being maintained in constant relative positions, so that the movable blades 8b secured to the coil pusher 26 are positioned higher than the fixed blades 8a. The pusher 249 becomes stationary when the upper surface of the coil pusher 26 is disposed in a position higher than that of the stator core 1. At this time, the coil pusher 26 has finished the operation of axially inserting the main and auxiliary coils in the slots 3 of the stator core 1, and the insulator pushers 283 have finished the operation of inserting insulating pieces 5 in the slots 3 of the stator core 1. The blade position setter 270 which is disposed at the forward ends of the movable blades 8b is mounted in the mounting portion 279. Thereafter, the motor 263 is rotated in the reverse direction to move the pusher 249 downwardly and to restore the coil pusher rod 244 and the insulator pushers 238 to their original positions. Then, the holding-down plate 282 is released from contact with the upper surface of stator core 1 which is then manually removed from the transfer tool A.

This completes the insertion of the main coils 6, the auxiliary coils 7 (including one or a plurality of the speed regulation coils when necessary) and the insulating pieces 5 in the stator core 1 simultaneously in one operation.

Although the present invention has been fully described by way of example with reference to the attached drawings, it is to be noted that various changes and modifications will be apparent to those skilled in the art. Therefore, unless otherwise such changes and modifications depart from the scope of the present invention, they should be constructed as being included therein.

What is claim is:

1. A device for holding a stator of an electrical machine having an axis about which an associated rotor of the electrical machine is rotated, said holding device being used in a drawing-in device arranged to insert winding coils from a transfer tool into the stator core and being arranged to hold the stator core when the winding coils are inserted into the stator core in one operation of the drawing-in device, said holding device comprising:
   i. a pusher block including a holding-down plate integrally incorporated therewith;
   ii. means for driving said pusher block so that said holding-down plate is moved to the stator core supported by the transfer tool carrying winding coils to be inserted and holds the stator core when the winding coils are inserted into the stator core from the transfer tool;
   iii. first and second guide rollers fitted to said pusher block; and
   iv. a stationary cam plate fixed to the drawing-in device and defining therein a cam groove with which said first and second guide rollers cooperate so as to move said holding-down plate to the stator core and hold the stator core with a predetermined force parallel to said axis.

2. A device as set forth in claim 1, wherein said cam groove comprises a portion parallel to said axis.

3. A device as set forth in claim 1, wherein said first and second guide rollers are rotatably carried by said pusher block through shafts, respectively, and said driving means drives said pusher block through one of said shafts.

4. A device as set forth in claim 3, wherein said driving means comprises a link coupled at one end to said one of said shafts, a lever pivotably fitted at one end to said stationary cam plate and connected at the other end to the other end of said link, a coupling link connected at one end to the middle of said lever and a cylinder attached at one end to said drawing-in device and coupled at the other end to the other end of said coupling link.

* * * * *